United States Patent
Miyashita

(10) Patent No.: US 7,369,293 B2
(45) Date of Patent: May 6, 2008

(54) MOUNTING CASE FOR ELECTRO-OPTICAL DEVICE, ELECTRO-OPTICAL DEVICE AND ELECTRONIC APPARATUS

(75) Inventor: Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 191 days.

(21) Appl. No.: 11/209,835

(22) Filed: Aug. 24, 2005

(65) Prior Publication Data
US 2006/0082695 A1 Apr. 20, 2006

(30) Foreign Application Priority Data
Oct. 19, 2004 (JP) ............... 2004-303811

(51) Int. Cl.
*G02F 1/03* (2006.01)
(52) U.S. Cl. ...................... 359/254; 359/245
(58) Field of Classification Search ............... 359/254, 359/245
See application file for complete search history.

(56) References Cited

U.S. PATENT DOCUMENTS
6,414,781 B1 * 7/2002 Saitoh ................ 359/245
2004/0246398 A1 * 12/2004 Kojima et al. ............. 349/58

FOREIGN PATENT DOCUMENTS
JP A 2004-198934 7/2004

* cited by examiner

*Primary Examiner*—Scott J. Sugarman
*Assistant Examiner*—Darryl J. Collins
(74) *Attorney, Agent, or Firm*—Oliff & Berridge, PLC

(57) ABSTRACT

A mounting case for an electro-optical device accommodates an electro-optical panel that is used in the electro-optical device in which display images are displayed on the basis of electrical signals transmitted to and from the outside through the mounting case. The mounting case for an electro-optical device includes a body portion that is constructed to accommodate the electro-optical panel in a state in which one end of a flexible wiring board for transmitting the electrical signals is connected to the periphery of the electro-optical panel and which has a wall portion defining an opening through which the other end of the flexible wiring board leads from the inside to the outside of the mounting case. The wall portion has a cross-sectional shape that widens from the inside to the outside of the mounting case in a cross section crossing a surface of the flexible wiring board in a direction from the inside toward the outside of the mounting case.

11 Claims, 10 Drawing Sheets

MOUNTING CASE FOR ELECTRO-OPTICAL DEVICE, ELECTRO-OPTICAL DEVICE AND ELECTRONIC APPARATUS

This application claims the benefit of Japanese Patent Application No. 2004-303811, filed Oct. 19, 2004. The entire disclosure of the prior application is hereby incorporated by reference herein in its entirety.

BACKGROUND OF THE INVENTION

1. Technical Field

The present invention relates to a mounting case for mounting an electro-optical panel used in an electro-optical device, to an electro-optical device, such as a liquid crystal device, having the electro-optical panel, and to an electronic apparatus that uses the electro-optical device as a light valve.

2. Related Art

This electro-optical panel is not installed in a casing body of a device as it is in a so-called panel state, but is installed in a state in which it is mounted or accommodated in a proper mounting case, when it is used as a light valve in an electronic apparatus, such as a liquid crystal projector. The reason why the electro-optical panel is accommodated in the mounting case is that the electro-optical panel can be easily fixed or attached to the casing body through screw holes by providing the screw holes in the mounting case.

In such an electronic apparatus, projection light to the electro-optical device is extremely strong. Therefore, in order to prevent the electro-optical panel from deteriorating due to a high temperature, the mounting case is generally provided with a cooling mechanism, as disclosed in Japanese Unexamined Patent Application Publication No. 2004-198934. Furthermore, as disclosed in Japanese Unexamined Patent Application Publication No. 2004-198934, the electro-optical panel generally has an external circuit connecting terminal formed at its circumference in order to communicate an electrical signal with the outside. A flexible wiring board is mounted at the circumference of the electro-optical panel. The other end of the flexible wiring board whose one end is connected to the electro-optical panel in the mounting case leads to the outside through the opening of the mounting case and is then connected to a connector of an external circuit board.

However, at this time, if the other end of the flexible wiring board is bent toward the connector and comes into contact with the mounting case, there is a possibility that the flexible wiring board can be damaged, like disconnection or a short circuit of wiring lines provided on the surface.

SUMMARY

An advantage of the present invention is that it provides a mounting case for an electro-optical device, which can prevent a portion led from a flexible wiring board from being damaged, an electro-optical device having the mounting case, and an electronic apparatus having the electro-optical device.

According to a first aspect of the invention, a mounting case for an electro-optical device accommodates an electro-optical panel that is used in the electro-optical device in which display images are displayed, electrical signals are transmitted to and from the outside through the mounting case. The mounting case for an electro-optical device includes a body portion which is constructed to accommodate the electro-optical panel in a state in which one end of a flexible wiring board for transmitting the electrical signals is connected to the periphery of the electro-optical panel and which has a wall portion defining an opening through which the other end of the flexible wiring board leads from the inside to the outside of the mounting case. Further, the wall portion has a cross-sectional shape that widens from the inside to the outside of the mounting case in a cross section crossing a surface of the flexible wiring board in a direction from the inside toward the outside of the mounting case.

In the mounting case for the electro-optical device (hereinafter, referred to as 'a mounting case', the electro-optical panel is accommodate within the body portion, and the flexible wiring board leads to the outside of the case through the opening formed in the body portion. The mounting case preferably has an opening, but is not limited thereto. Furthermore, the number of the flexible wiring board connected to the electro-optical panel or the number of the opening formed in the mounting case is not limited.

A flexible wiring board such as an FPC (flexible printed circuit board) has flexibility. Thus, the other end of the flexible wiring board can be freely connected to an external connector disposed outside the mounting case in a state in which its one end is connected to the electro-optical panel in the mounting case. In this case, if there is no mechanism in the wall portion that defines the opening in the mounting case body, the flexible wiring board can be severely bent when connected to an external connector. Thus, there is a possibility that the flexible wiring board can be damaged due to contacting with a ridge portion constituting the outer edge of the wall portion. In other words, the mounting case is generally made of metal in terms of rigidity or heat radiation. There is a disadvantage that wiring lines provided on a surface of the flexible wiring board can be damaged due to contacting with the angulated ridge portion. Further, if the flexible wiring board is bent along the ridge, there is a disadvantage that the circuit board itself can be damaged because stress is concentrated on the contacting portion of the board.

On the other hand, the wall portion that defines the opening in the mounting case has the cross-sectional shape that widens from the inside to the outside of the mounting case in the cross section crossing the surface of the flexible wiring board in the direction from the inside toward the outside of the mounting case. In other words, the wall portion has a shape in which a region having a formation region of the ridge portion is not angulated, instead of the ridge portion. For this reason, it is possible to prevent the flexible wiring board from being damaged due to the ridge portion. The wall portion can have a cross-sectional shape in which at least the outer edge in a direction where the flexible wiring board is bent widens from the inside to the outside of the mounting case.

Further, the electro-optical panel accommodated in the mounting case projects display images as the light valve of the projector and receives heat generated by projection light when driven. In the mounting case, the wall portion defining the opening has the cross-sectional shape that widens from the inside to the outside of the mounting case. Ventilation can be relatively smoothly performed inside and outside the casing. It is possible to increase a cooling effect of the electro-optical panel. Therefore, it is possible to suppress hot spots from generating.

As described above, in the mounting case for the electro-optical device, damage to the flexible wiring board connected to the electro-optical panel can be prevented, and the manufacturing quality of an electronic apparatus using the electro-optical device in which the electro-optical panel is mounted in the mounting case can be prevented from lowering. Further, the mounting case for the electro-optical device can contribute to improving cooling efficiency of the electro-optical panel by the shape of the wall portion, and can prevent the display quality in the electro-optical device from lowering.

Preferably, the edge portion is chamfered at the outer edge of the opening.

According to this aspect, the wall portion defining the opening has its outer edge which is chamfered and thus has the cross-sectional shape that widens from the inside to the outside of the mounting case. In this case, the wall portion has its angulated ridge portion cut, and the angle of the outer edge is mitigated. Accordingly, the same operation and effect as those described above can be obtained.

Preferably, the edge portion is rounded at the outer edge of the opening.

According to this aspect, the wall portion defining the opening has its outer edge rounded and has the cross-sectional shape that widens from the inside to the outside of the mounting case. Accordingly, the angle of the outer edge is mitigated, so that the same operation and effects as those described above can be obtained.

Preferably, the body portion includes a mounted member on which the electro-optical panel is mounted, and a cover member that covers an upper side of the mounted member. The wall portion is constructed as a portion through which the mounted member and the cover member are opposite to each other with a predetermined gap interposed therebetween.

According to this aspect, the body portion of the mounting case includes the mounted member having the electro-optical panel mounted thereon, and the cover member covering the top surface of the mounted member. Further, the wall portion defining the opening of the body portion is not composed of one of the mounted member and the cover member, but both of them. The opening has a thin slit shape according to a thin flexible wiring board. It is easy to combine grooves of the two members rather than penetrating one surface in manufacturing it. If the edge is slightly modified, the latter is advantageous in design.

Preferably, a protective film is locally disposed at a portion of the flexible wiring board that can come into contact with the wall portion.

According to this aspect, in the case in which one end of the flexible wiring board is connected to the electro-optical panel accommodated in the mounting case and the other end leads to the outside of the mounting case through the opening, when the other end of the flexible wiring board is bent, the protective film is locally provided at the portion that may come into contact with the opening. The protective film can be an insulation film used for protecting wiring lines. The protective film can be formed on the flexible wiring board by means of a printing method, or a protective film of a film shape can be attached using an adhesive. In this case, it is possible to more surely prevent the flexible wiring board from being damaged.

Preferably, the wall portion extends from the inside to the outside of the mounting case at a predetermined region of a periphery of the body portion in plan view.

According to this aspect, the body portion has an opening formed by means of the wall portion having a tunnel shape extending in the direction from the inside toward the outside of the mounting case. Accordingly, a surface area of the body portion can be increased. It is thus possible to increase a ventilation effect due to the shape of the wall portion and cooling power of the mounting case.

Preferably, radiation pins are disposed on an external surface of the body portion in a predetermined region.

According to this aspect, the opening extends from the inside to the outside, and the radiation pins are formed on the external surface of the wall portion occupying a predetermined region in plan view. Accordingly, the region occupied by the wall portion of the body portion can be used more efficiently by an increased surface area of the mounting case. Cooling power of the mounting case can be further increased.

Preferably, the radiation pin can extend in a direction where the flexible wiring board extends.

In this case, the body portion is ventilated through the opening, and the radiation pin serves to form the flow of air in the ventilation direction. For this reason, cooling efficiency can be improved.

According to a second aspect of the invention, an electro-optical device includes the above-mentioned mounting case for an electro-optical device (but, it includes various aspects), the electro-optical panel accommodated in a body portion, and the flexible wiring board having one end connected to the periphery of the electro-optical panel and the other end led to the outside through the opening.

According to this aspect, the electro-optical panel to which one end of the flexible wiring board is connected is accommodated in the mounting case. Further, the other end of the flexible wiring board leads to the outside of the mounting case through the opening of the mounting case body. For this reason, damage to the flexible wiring board can be prevented and lowering of the manufacturing quality can be prevented. Furthermore, the electro-optical panel can be cooled down efficiently through the shape of the opening and lowering of the display quality can be prevented.

Further, the electro-optical device can include various devices such as a liquid crystal device, an organic EL device, an electrophoresis device, such as an electronic paper, and a display device (field emission display and surface-conduction electron-emitter display) using an electron emitting element.

According to a third aspect of the invention, an electronic apparatus includes the above-mentioned electro-optical device.

Since the electronic apparatus has the electro-optical device, it has the same operation and effects as those of the electro-optical device.

Furthermore, the electronic apparatus can include various electronic apparatuses such as television receivers, cellular phones, electronic notes, word processors, view-finder-type or monitor-direct-view-type video tape recorders, workstations, video phones, POS terminals and touch panels, all of which has the electro-optical device.

The operation and other advantages of the invention will be apparent from the following embodiments.

BRIEF DESCRIPTION OF THE DRAWINGS

The invention will be described with reference to the accompanying drawings, wherein like numbers reference like elements, and wherein.

DESCRIPTION OF THE EMBODIMENTS

Preferred embodiments of the invention will now be described with reference to the accompanying drawings.

1: Embodiment of Electronic Apparatus

Figure 1:
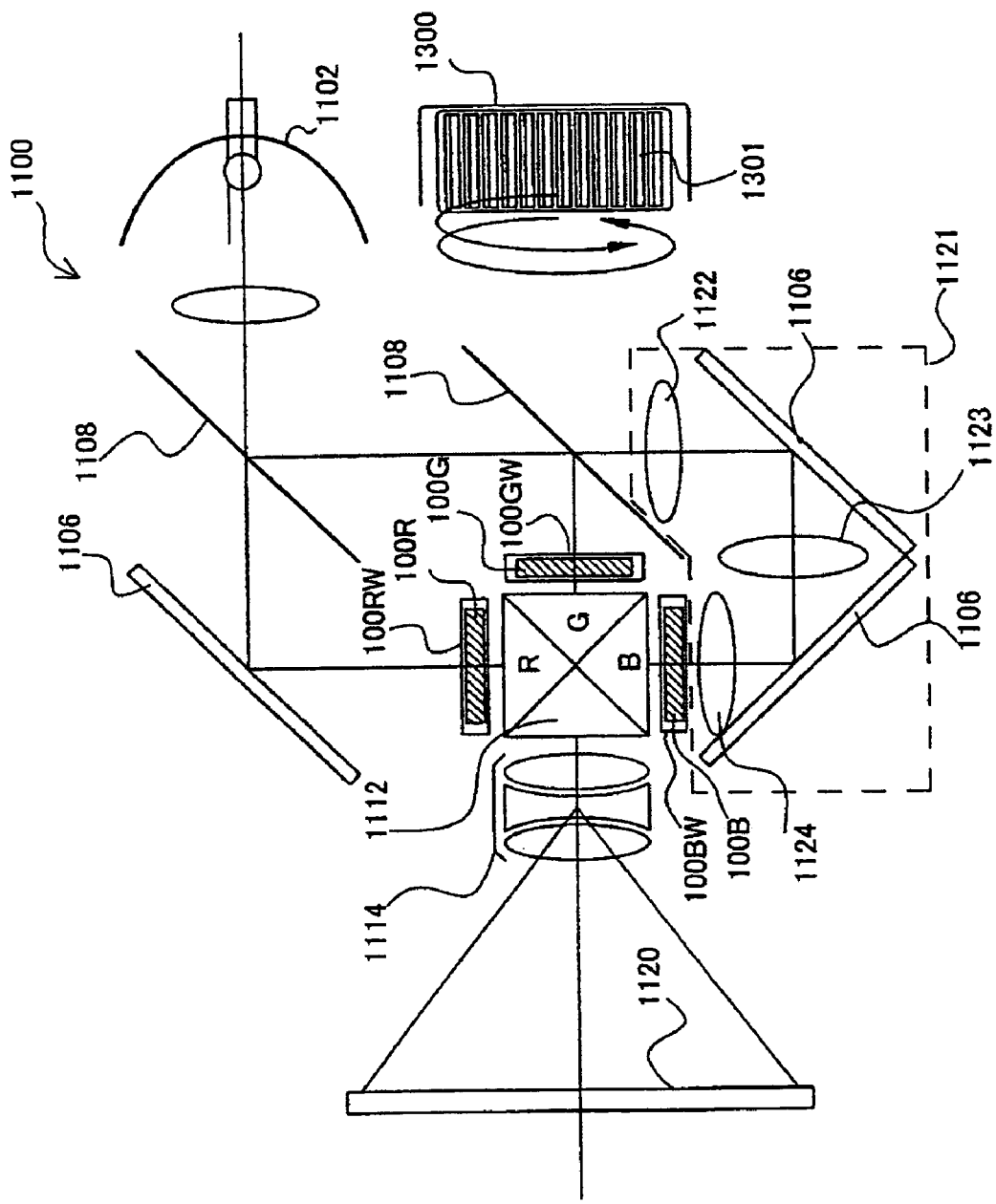
FIG. 1 is a plan view of an electronic apparatus according to an embodiment of the invention.

A structure of an electronic apparatus according to the present embodiment will be first described with reference to FIG. 1. FIG. 1 is a diagram schematically showing the structure of the electronic apparatus according to the present embodiment. Furthermore, in the present embodiment, a projection-type liquid crystal projector will be taken as an example of the electronic apparatus according to the invention.

In FIG. 1, a liquid crystal projector 1100 is composed of a multi-plate-type color projector using liquid crystal light valves 100R, 100G and 100B for RGB.

In the liquid crystal projector 1100, if projection light is emitted from a lamp unit 1102 of a white light source, such as a metal halide lamp, it is divided into light components R, G and B corresponding to three primary colors including RGB by means of three mirrors 1106 and two dichroic mirrors 1108. The light components R, G and B are then guided to the liquid crystal light valves 100R, 100G and 100B corresponding to the respective colors. At this time, in particular, the B light component is guided through a relay lens system 1121 having an incidence lens 1122, a relay lens 1123, and an emission lens 1124 in order to prevent optical loss from occurring due to a long optical path. The optical components, each corresponding to the three primary colors modulated by the liquid crystal light valves 100R, 100G and 100B, are combined by a dichroic prism 1112 and are then projected onto a screen 1120 through a projection lens 1114 as a color image. Furthermore, in the following description, when the liquid crystal light valves 100R, 100G and 100B are used without any discrimination, it refers to the liquid crystal light valve 100. Further, in the present embodiment, each of the liquid crystal light valves 100R, 100G and 100B corresponds to one specific example of an 'electro-optical device' according to the invention.

The liquid crystal light valve 100 can be constructed in such a manner that an active-matrix-driven liquid crystal panel, which will be described below, is accommodated in a mounting case.

Furthermore, the liquid crystal projector 1100 is provided with a sirocco fan 1300 for sending cooling air to the liquid crystal light valves 100R, 100G and 100B. The sirocco fan 1300 may include a substantially cylindrical member with a plurality of blades 1301 mounted on the sides. The cylindrical member rotates about its axis, so that the blade 1301 generates a wind. The wind generated by the sirocco fan 1300 swirls in a spiral pattern on the basis of this mechanism. This wind is sent to the liquid crystal light valves 100R, 100G and 100B through an air passage (not shown in FIG. 1), and is send to the liquid crystal light valves 100R, 100G and 100B through supply openings 100RW, 100GW and 100BW provided near the liquid crystal light valves 100R, 100G and 100B.

In the above-described configuration, mounting cases of the liquid crystal light valves 100R, 100G and 100B are attached to three sides of the dichroic prism 1112, respectively. An FPC connected to the liquid crystal device leads from each of the mounting cases. Each end of the FPC is bent upward or downward from the dichroic prism 1112 and is then connected to an external connector. At this time, if the ends of the FPC are bent too much, there is a possibility that the FPC may be damaged.

Furthermore, when the liquid crystal projector 1100 is driven, the light emitted from the lamp unit 1102, which is a powerful light source, causes a temperature increase in the liquid crystal light valve 100. At this time, an extreme temperature rise may cause degradation of liquid crystal of the liquid crystal light valve 100 or unevenness of transmittance due to hot spots generated by uneven heating of the liquid crystal panel caused by light irregularity of the light source.

Therefore, in the present embodiment, the liquid crystal light valve 100 is constructed as described below in order to prevent the FPC from being damaged and to effectively suppress an increase in a temperature.

2: Embodiment of Electro-Optical Device

An electro-optical device according to an embodiment of the invention will now be described. The liquid crystal light valve 100, which is an example of the 'electro-optical device' according to the invention, is constructed in such a manner that the liquid crystal panel is accommodated in the mounting case. Therefore, the structure of the liquid crystal panel will be described with reference to FIGS. 2 and 3. The entire structure of the liquid crystal light valve 100 will be described with reference to FIGS. 4 to 11.

2-1: Structure of Liquid Crystal Panel

Figure 2:
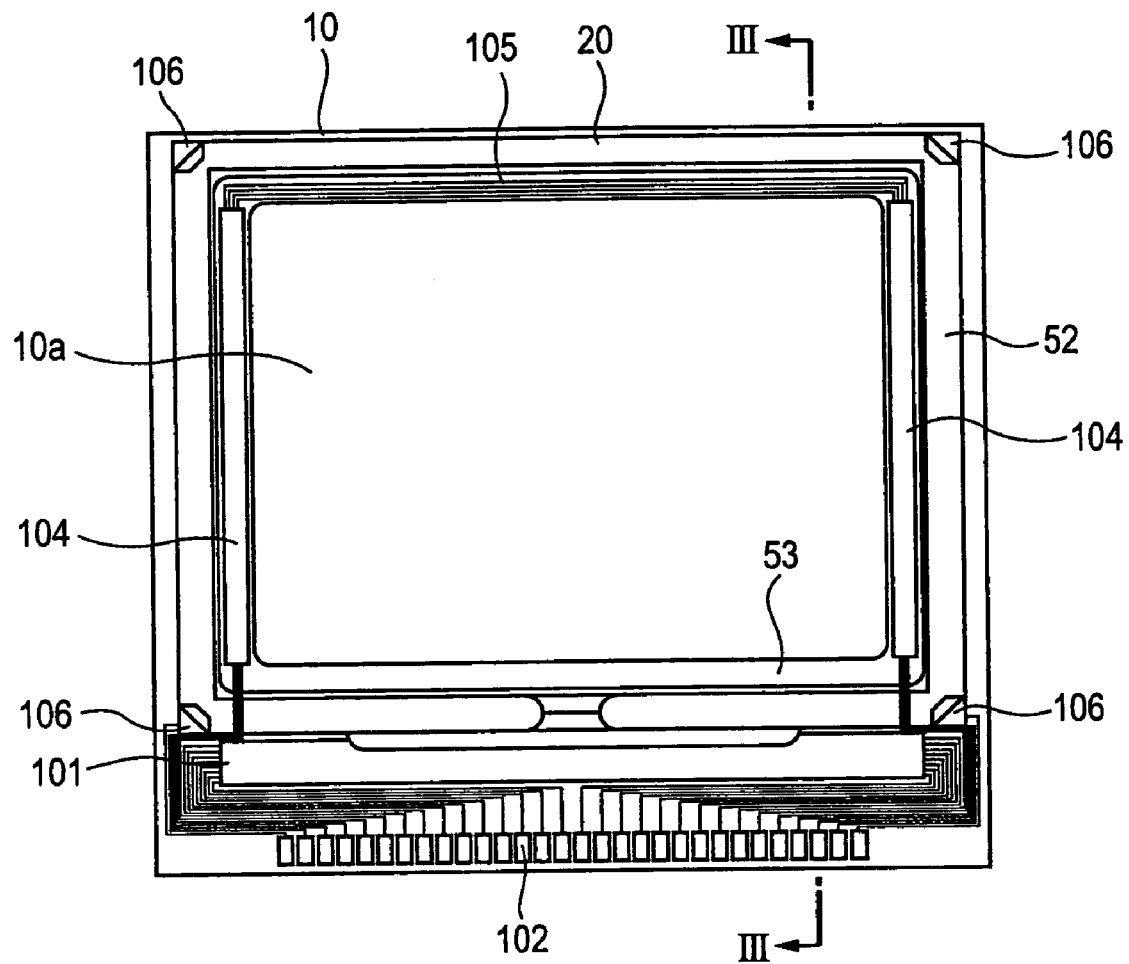
FIG. 2 is a plan view of an electro-optical device according to an embodiment of the invention.
Figure 3:
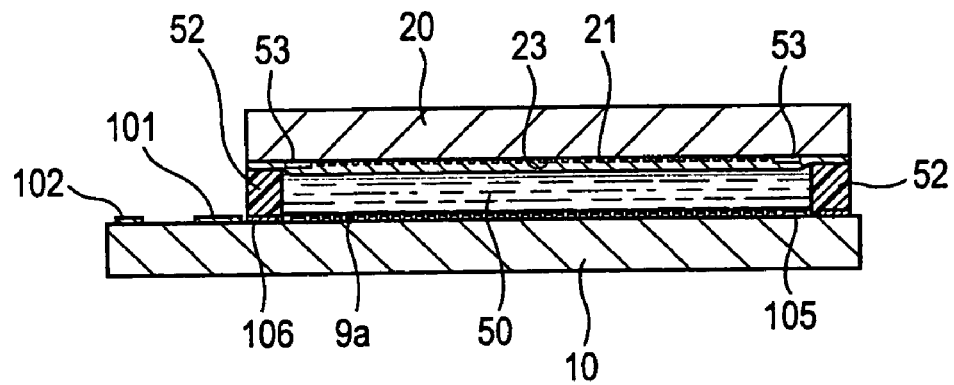
FIG. 3 is a cross-sectional view of the liquid crystal panel taken along the line III-III of FIG. 2.

The liquid crystal panel according to the present embodiment is one specific example of 'the electro-optical panel' according to the present invention, and employs a TFT-active-matrix driving method of a driving circuit built-in type. FIG. 2 is a plan view of the liquid crystal panel when a TFT array substrate is seen from a counter substrate side together with respective components formed thereon. FIG. 3 is a cross-sectional view of the liquid crystal panel taken along the line III-II of FIG. 2.

In FIGS. 2 and 3, the liquid crystal panel has a TFT array substrate 10 and a counter substrate 20, which are disposed opposite to each other. A liquid crystal layer 50 is sealed between the TFT array substrate 10 and the counter substrate 20. The TFT array substrate 10 and the counter substrate 20 are bonded by means of a sealant 52 provided in a sealing region located around an image display region 10a.

The sealant 52 is formed of a ultraviolet curable resin, a thermosetting resin or the like in order to bond both substrates. In a manufacture process, the sealant 52 is coated on the TFT array substrate 10 and is then cured by means of ultraviolet irradiation, heating or the like. Further, a gap material, such as glass fibers or glass beads, for making a distance between the TFT array substrate 10 and the counter substrate 20 (a gap between the substrates) a predetermined value is dispersed in the sealant 52. In other words, the electro-optical device according to the present embodiment is suitable for the light valve of the projector to perform enlarged display.

A frame light-shielding film 53 having a light-shielding property, which defines a frame region of the image display region 10a, is provided at the counter substrate 20 side such that it is parallel to the inside of the sealing region where the sealant 52 is disposed. However, a portion or all of the frame light-shielding film 53 may be provided at the TFT array substrate 10 side as an inner light-shielding film.

Along one side of the TFT array substrate 10, a data line driving circuit 101 and external circuit connecting terminals 102 are provided in a peripheral region located outside the sealing region where the sealant 52 is disposed among the region that becomes wide to the periphery of the image display region. Further, scanning line driving circuits 104 are provided along two sides adjacent to the one side. Moreover, a plurality of wiring lines 105 for connecting the scanning line driving circuits 104 provided at both sides of the image display region 10a are provided at one remaining side of the TFT array substrate 10. In addition, as shown in FIG. 2, upper and lower conductive materials 106 serving as upper and lower conductive terminals between both substrates are disposed at four corners of the counter substrate 20. On the other hand, upper and lower conductive terminals are provided in regions of the TFT array substrate 10 opposite to these corners. Thereby, the TFT array substrate 10 and the counter substrate 20 can be electrically connected to each other.

In FIG. 3, a TFT for pixel switching or wiring lines, such as scanning lines and data lines, is formed on the TFT array substrate 10. An alignment film is formed on a pixel electrode 9a. On the other hand, a light-shielding film 23 having a matrix shape or stripe shape as well as a counter electrode 21 is formed on the counter substrate 20. In addition, an alignment film is formed on a top layer. Furthermore, the liquid crystal layer 50 is composed of liquid crystal in which a kind or a plurality of kinds of nematic liquid crystal is mixed. A predetermined alignment state is held between a pair of these alignment films.

Further, on the TFT array substrate 10 shown in FIGS. 2 and 3, in addition to the data line driving circuit 101 and the scanning line driving circuits 104, the following circuits may be formed: a sampling circuit that samples image signals on image signal lines and supplies these sampled image signals to the data lines, a precharge circuit that supplies precharge signals with a predetermined voltage level to a plurality of data lines prior to the image signals, and an inspection circuit that inspects the quality and defects of the electro-optical device during production or at shipping.

2-2: Structure of Liquid Crystal Light Valve

Figure 4:
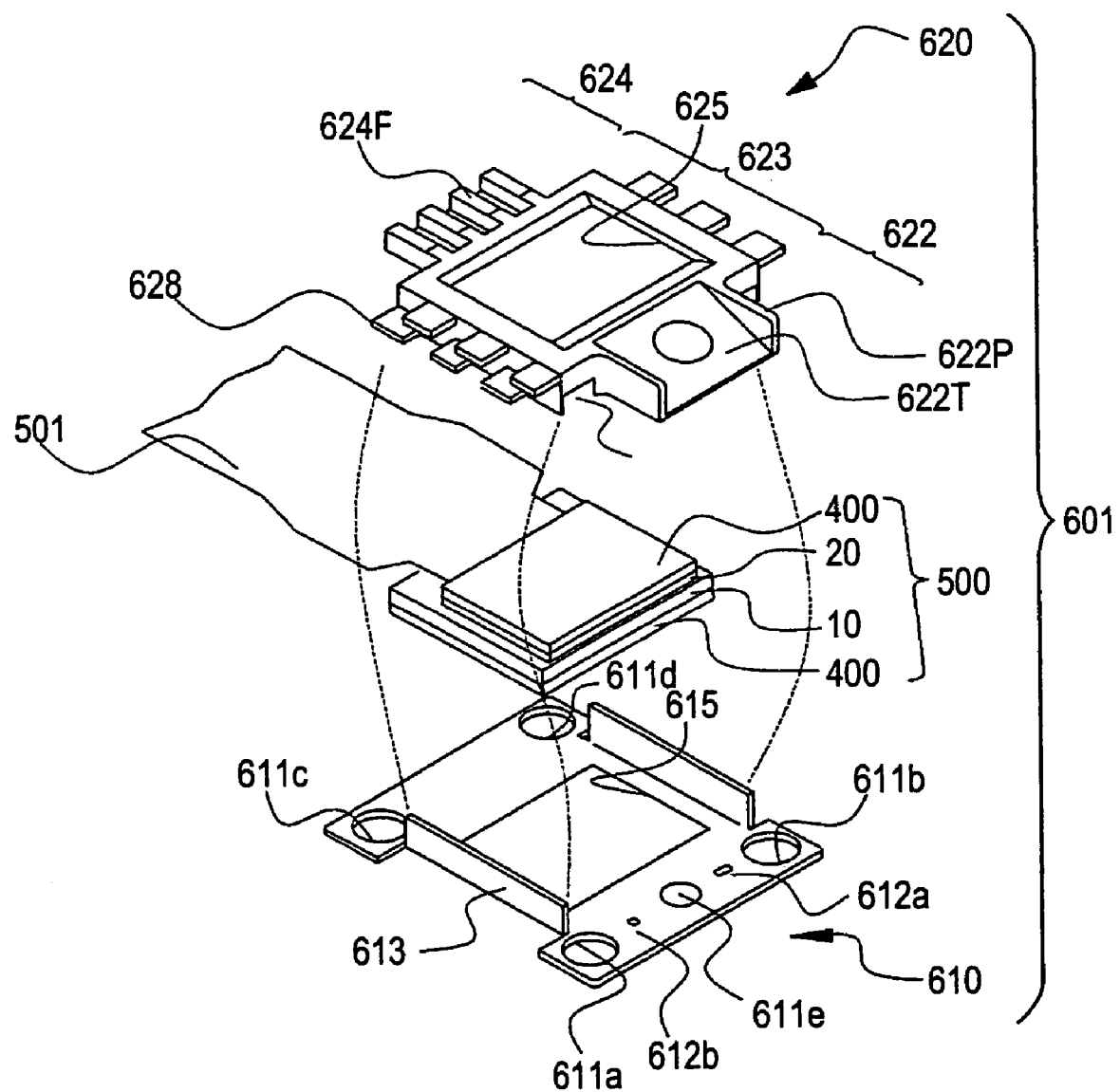
FIG. 4 is an exploded perspective view of the electro-optical device according to the embodiment of the present invention.
Figure 5:
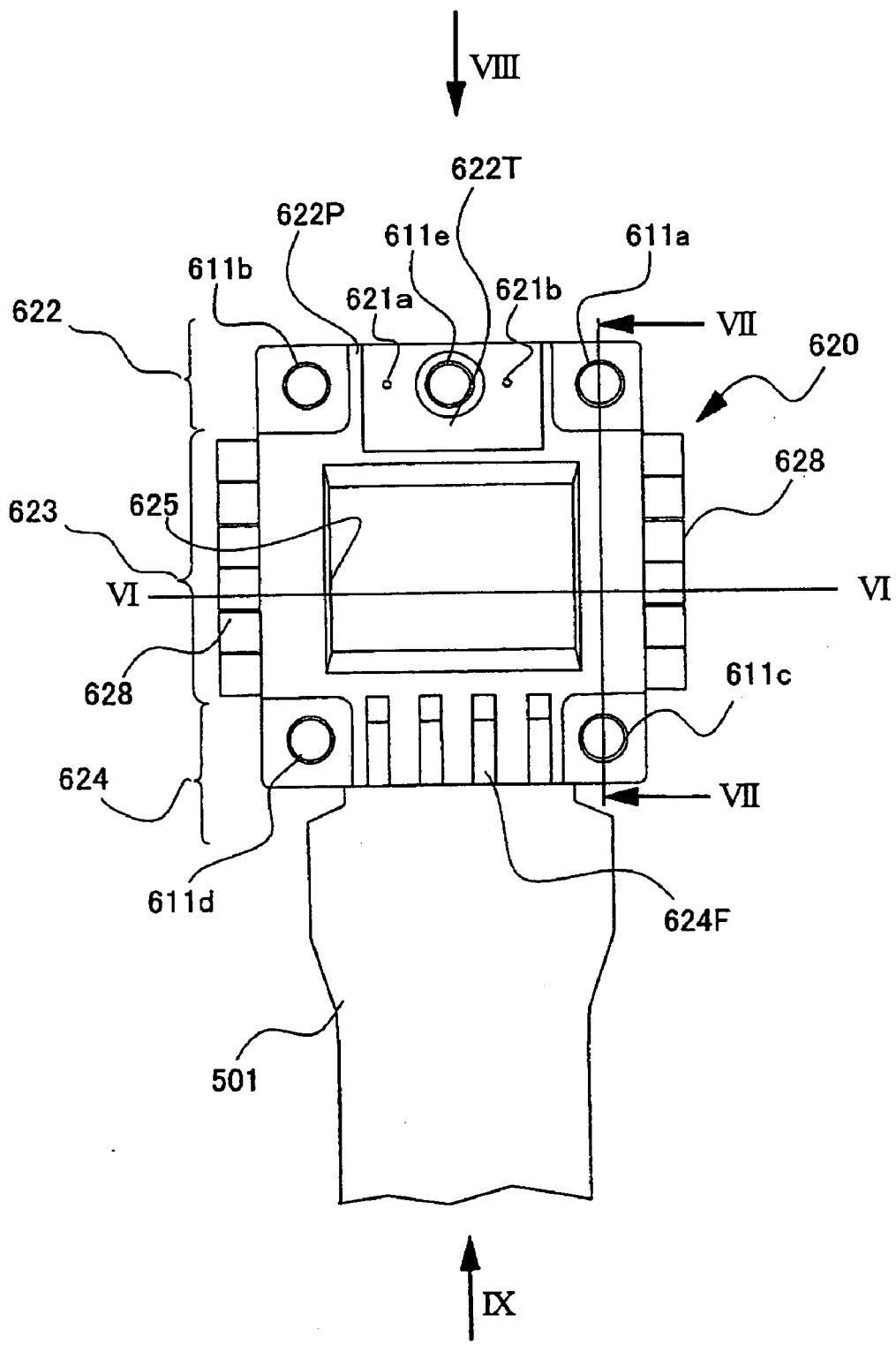
FIG. 5 is a plan view of the electro-optical device according to the embodiment of the invention.
Figure 6:
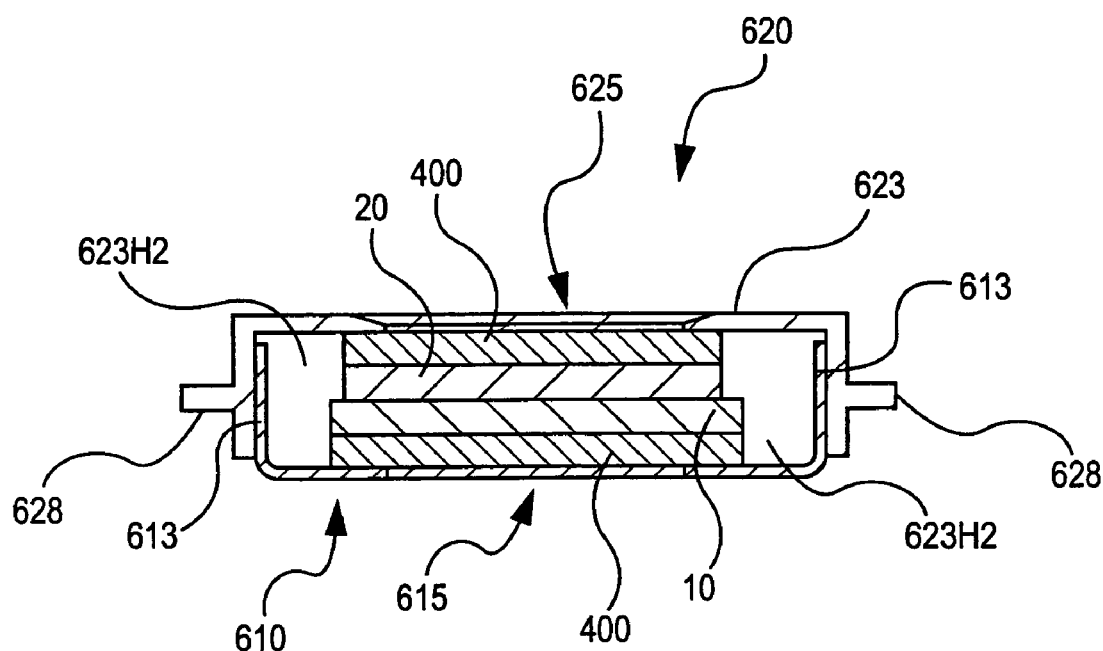
FIG. 6 a cross-sectional view of the electro-optical device taken the along line VI-VI of FIG. 5.
Figure 7:
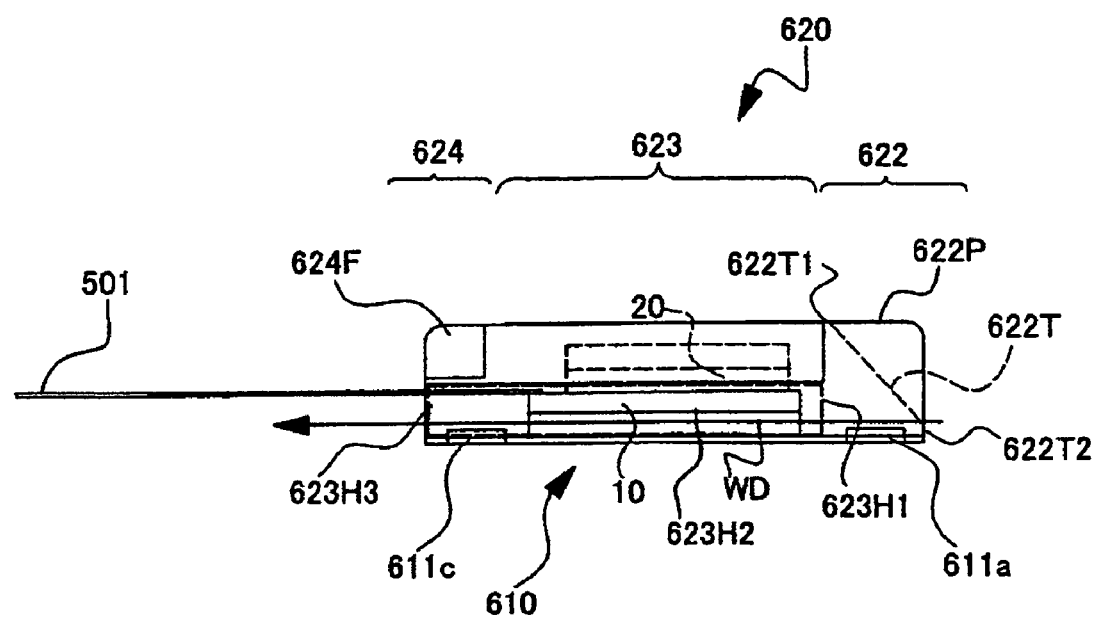
FIG. 7 is a perspective view of the electro-optical device taken along the line VII-VII of FIG. 5.
Figure 8:
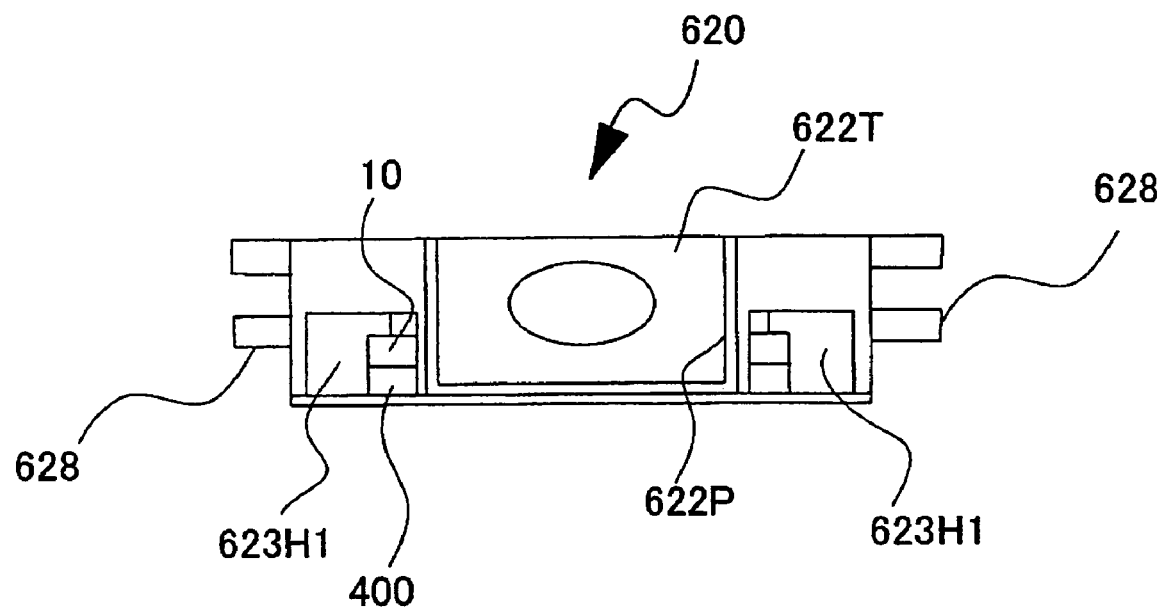
FIG. 8 is a front view of the electro-optical device that faces a direction of VIII in FIG. 5.
Figure 9:
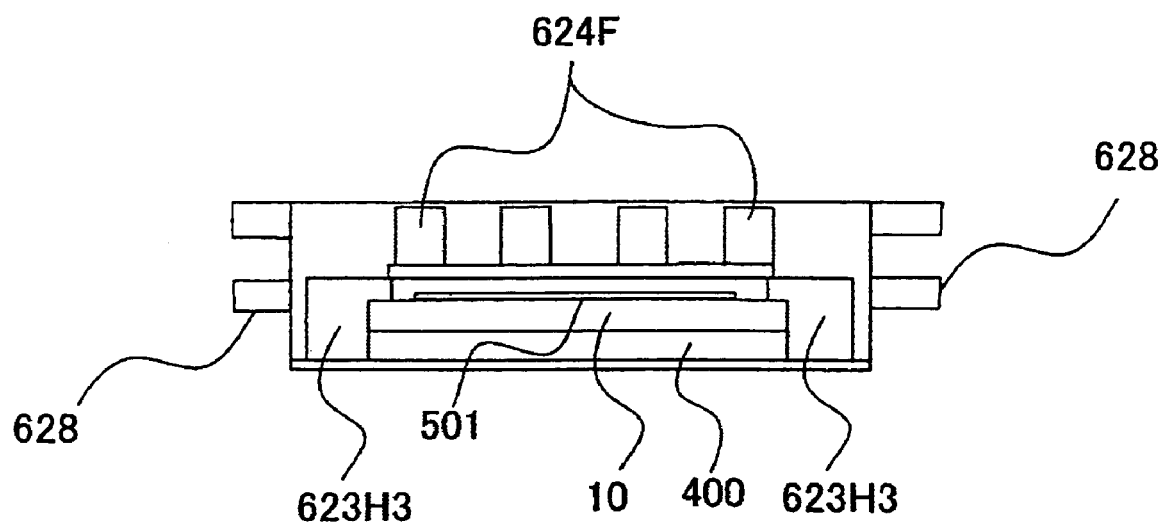
FIG. 9 is a rear view of the electro-optical device that faces a direction of IX in FIG. 5.
Figure 10:
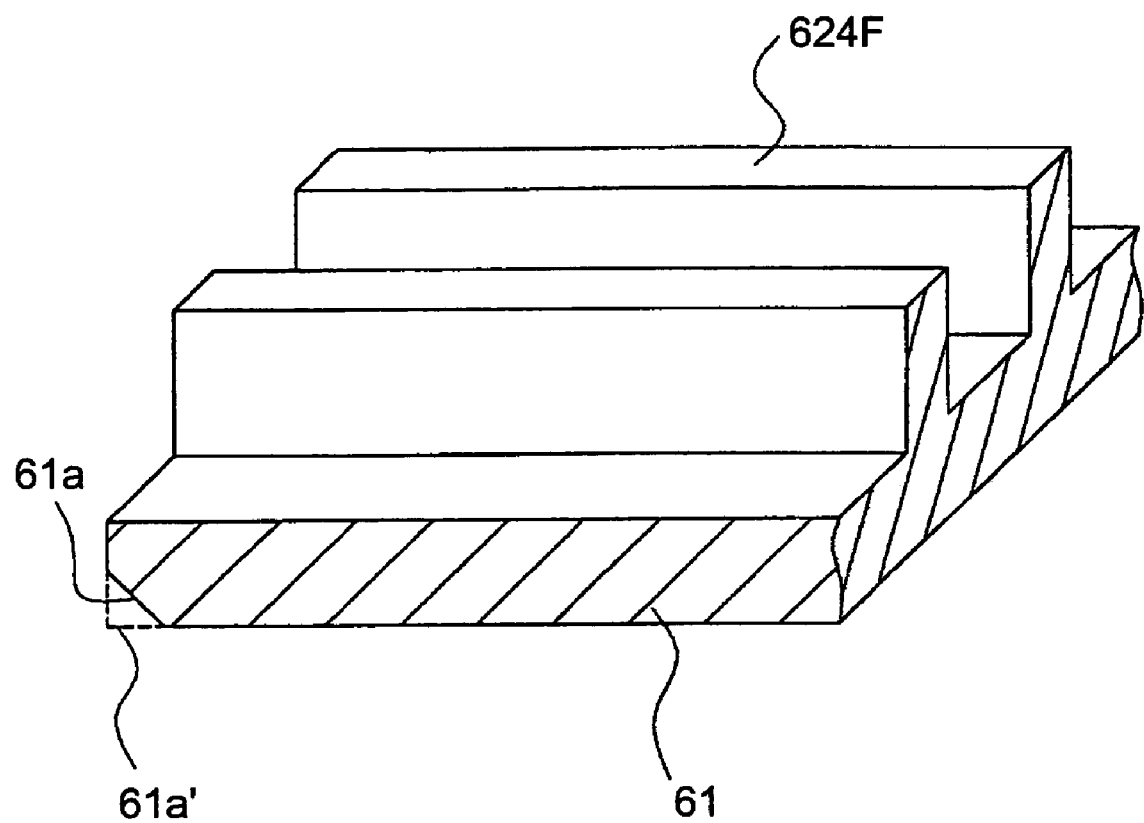
FIG. 10 is a partially enlarged perspective view of an electro-optical device according to an embodiment of the invention.

Next, a specific structure of the liquid crystal light valve having the above-mentioned liquid crystal panel mounted thereon will be described with reference to FIGS. 4 to 11. FIG. 4 is an exploded perspective view illustrating the liquid crystal light valve according to the present embodiment. FIG. 5 is a plan view of the liquid crystal light valve, FIG. 6 is a cross-sectional view of the liquid crystal light valve taken along the line VI-VI of FIG. 5, and FIG. 7 is a cross-sectional view of the liquid crystal light valve taken along the line VII-VII of FIG. 5. FIG. 8 is a front view of the liquid crystal light valve, which is seen from a VIII direction of FIG. 5. FIG. 9 is a rear view of the liquid crystal light valve, which is seen from an IX direction of FIG. 5. FIGS. 10 and 11 are a partially enlarged perspective view and a partially enlarged cross-sectional view of the liquid crystal light valve according to the present embodiment.

As shown in FIGS. 4 to 9, a mounting case 601 includes a plate portion 610 and a cover portion 620. A liquid crystal panel 500 is disposed on a top surface of the plate portion 610, which is an example of a 'mounted member' according to the invention. The cover portion 620, which is an example of a 'cover member' according to the invention, covers a top surface of the plate portion 610.

The liquid crystal panel 500 accommodated in the mounting case 601 has the shame shape as shown in FIGS. 2 and 3. In the liquid crystal panel 500, an optical member, such as a reflection preventing plate, is provided on an external surface of the image display region, and an FPC (that is, a flexible printed circuit board) 501 is connected to an external circuit connecting terminal. Furthermore, a polarizer or a phase difference plate can be provided in an optical system of the liquid crystal projector 1100 or the liquid crystal panel 500. Further, dust-proof substrates 400 are provided at sides of the TFT array substrate 10 and the counter substrate 20, which are not opposite to the liquid crystal layer 50 (see FIG. 4).

Further, in the present embodiment, it is assumed that light is incident on the cover portion 620, passes through the liquid crystal panel 500 and is emitted from the plate portion 610. More specifically, as shown in FIG. 1, the plate portion 610, not the cover portion 620, is opposite to the dichroic prism 1112.

In FIG. 4, the plate portion 610 has a window portion 615, a bent portion 613, cover portion fixing holes 612a and 612b, and mounting holes 611a to 611e.

In the window portion 615, a portion of a member having substantially a rectangular shape has an opening, which allows the light having passed through the liquid crystal panel 500 to be emitted. In other words, the window portion 615 is provided opposite to the image display region 10a of the liquid crystal panel 500. The peripheral region located around the image display region 10a comes into contact with the periphery of the window portion 615. For this reason, heat can be transmitted from the liquid crystal panel 500 to the plate portion 610.

The bent portion 613 has its two side portions which are opposite to the plate portion 610 and are bent toward the inner side. An external surface of the bent portion 613 comes into contact with an inner surface of the cover portion 620 when the plate portion 610 and the cover portion 620 are combined (see FIG. 6). For this reason, the heat transmitted from the liquid crystal panel 500 to the plate portion 610 can be transmitted to the cover portion 620 through the bent portion 613.

The cover portion fixing holes 612a and 612b are respectively fitted into convex portions 621a and 621b, which are formed at corresponding locations of the cover portion 620. The convex portions 621a and 621b are fit into the cover portion fixing holes 612a and 612b, so that the plate portion 610 and the cover portion 620 are fixed.

The mounting holes 611a to 611d are used when the liquid crystal light valve is installed in the liquid crystal projector 1100, as shown in FIG. 1. The mounting holes 611a to 611d are provided at four corners of a member having substantially a rectangular shape. Furthermore, the plate portion 610 is provided with a mounting hole 611e as well as the mounting holes 611a to 611d. The mounting hole 611e is provided so as to form a triangle together with the mounting holes 611c and 611d among the mounting holes 611a to 611d. As a result, in the liquid crystal light valve of the present embodiment, both four-point fixation using the mounting holes 611a to 611d provided at the four corners, and three-point fixation using the mounting holes 611e, 611c and 611d can be performed.

The cover portion 620 is preferably made of metal, a light-shielding resin or the like such that it prevents stray light from entering the image display region 10a from the peripheral region while preventing light from leaking in the peripheral region of the liquid crystal panel 500. The cover portion 620 preferably functions as a heat sink for the plate portion 610 or the liquid crystal panel 500. Therefore, the cover 620 may be preferably made of a material with relatively large heat conductivity, specifically, aluminum, magnesium, copper, or an alloy thereof.

This cover portion 620 has the convex portions 621a and 621b, a cooling air introducing portion 622, a cooling air discharging portion 624, and a cover body portion 623.

The convex portions 621a and 621b are used for fixing the cover portion to the plate portion 610, as described above, and are formed at locations corresponding to the cover portion fixing holes 612a and 612b (Further, although the convex portions 621a and 621b are not shown in FIG. 4, they are shown in FIG. 5).

The cover body portion 623 is composed of a member having an approximately rectangular shape, as shown in FIGS. 4 to 9, and is interposed between the cooling air introducing portion 622 and the cooling air discharging portion 624, which will be described in detail below. However, an inner portion of the cover body portion 623 is hollow to accommodate the liquid crystal panel 500. More specifically, the cover body portion 623 has a window portion 625, side pin portions 628 and a cooling air conductive portion 623H (623H1 to 623H3). Of them, the window portion 625 has an opening such that light can be transmitted from the top to the bottom in FIG. 6. The light emitted from the lamp unit 1102 in the liquid crystal projector 1100 shown in FIG. 1 can pass through the window portion 625 to be incident on the liquid crystal panel 500. Further, the periphery of the window portion 625 comes into contact with the peripheral region of the liquid crystal panel 500 like the periphery of the window portion 615 of the plate portion 610. Thereby, heat can be efficiently transmitted from the liquid crystal panel 500 to the cover portion 620.

The side pin portions 628 are composed of portions, which are arranged in a zigzag at both sides of the cover body portion 623. It serves to increase the surface area of the cover body portion 623 to the cover portion 620.

The cooling air introducing portion 622 includes a tapered portion 622T and a cooling air guiding plate 622P, as clearly shown in FIG. 4 or 7. In this case, the tapered portion 622T has a base 622T1 having the maximum height at the side of the cover body portion 623 (where, the term 'height' refers to a distance in a vertical direction of FIG. 7) and a tip 622T2 whose height gradually decreases. The cooling air guiding plate 622P is erected at both sides of the tapered portion 622T.

The cooling air discharging portion 624 includes rear pin portions 624F, as clearly shown in FIGS. 4, 5, and 9. The plurality of rear pin portions 624F are projected in a straight line so as to be parallel to each other, and serve to increase the surface area of the cover portion 620.

The cooling air conductive portion 623H includes a cooling air inlet 623H1 (see FIG. 8), a passage 623H2 (see FIG. 7) and a cooling air outlet 623H3 (see FIG. 9). As can be seen from FIGS. 8 and 9, the cooling air inlet 623H1 and the cooling air outlet 623H3 are formed at both sides of the cover body portion 623, which are opposite to each other. The passage 623H2 is formed between the cooling air inlet 623H1 and the cooling air outlet 623H3 using the inner surface of the cover body portion 623 and both sides of the liquid crystal panel 500.

In the embodiment, the other end of the FPC 501 having its one end connected to the liquid crystal panel 500 leads from the cooling air outlet 623H3 to the outside of the mounting case 601.

In FIG. 10, a wall portion 61 that defines an opening serving as the cooling air outlet 623H3 by the mounting case 601 has a cross-sectional shape that widens from the inner side to the outer side of the mounting case 601 in a cross section crossing the surface of the FPC 501 in a direction from the inside to the outside of the mounting case 601 (that is, the cross section of the wall portion 61 in FIG. 10). Specifically, a cut portion 61a in which a ridge portion 61a' is chamfered is formed at an outer edge of the wall portion 61. In other words, the outer edge of the wall portion 61 is constructed in such a manner that the angular ridge portion 61a' is cut and has a smooth surface.

The wall portion 61 serves a portion through which the plate portion 610 and the cover portion 620 are opposite to each other at a predetermined gap (see FIG. 9). The wall portion 61 is provided to extend in a direction from the inside toward the outside of the mounting case 601 in accordance with the cooling air discharging portion 624 (see FIG. 5). Further, rear pin portions 624F are disposed on an external surface of the wall portion 61 toward the cover portion 620. The rear pin portions 624F are provided in a direction where the FPC 501 extends, that is, a direction where the cooling air conductive portion 623H extends.

Figure 11A:
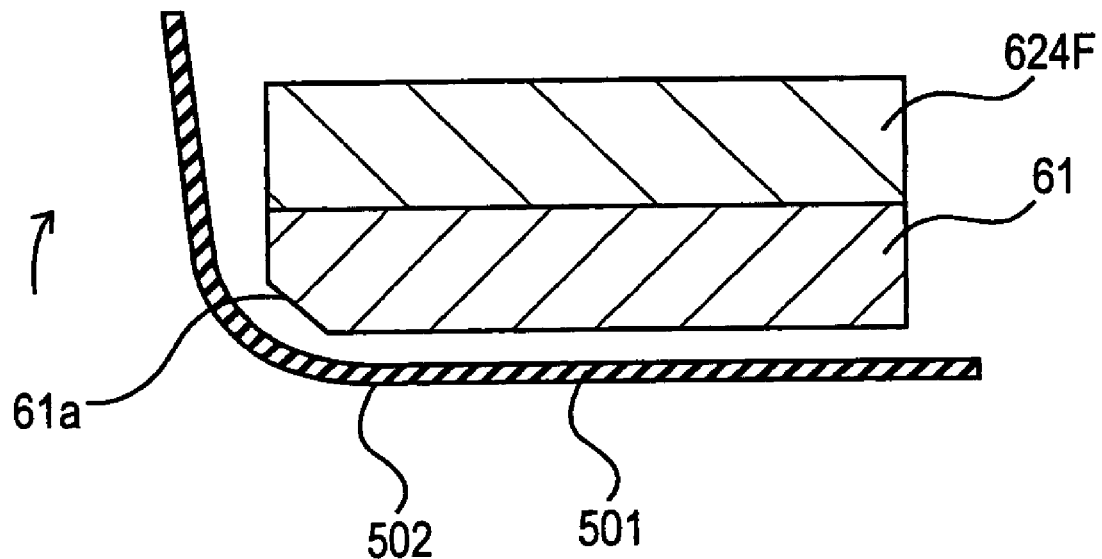
FIG. 11A is a partially enlarged cross-sectional view showing an electro-optical device according to an embodiment of the invention.

In FIG. 11A, the FPC 501 leads from the cooling air outlet 623H3 that is defined by the wall portion 61, and is then connected to an external connector at a predetermined side of the dichroic prism 1112, as shown in FIG. 1. Therefore, when the liquid crystal projector 1100 is assembled, the FPC 501 is bent toward the rear pin 624F side, as indicated by an arrow. At this time, the outer edge of the wall portion 61 is not angulated by means of the cut portion 61a. As a result, it can be prevented that the FPC 501 itself or wiring lines formed on the surface of the FPC 501 are damaged due to contacting with the outer edge of the wall portion 61. In addition, it is possible to prevent the FPC 501 from contacting with the outer edge by some degree.

Figure 11B:
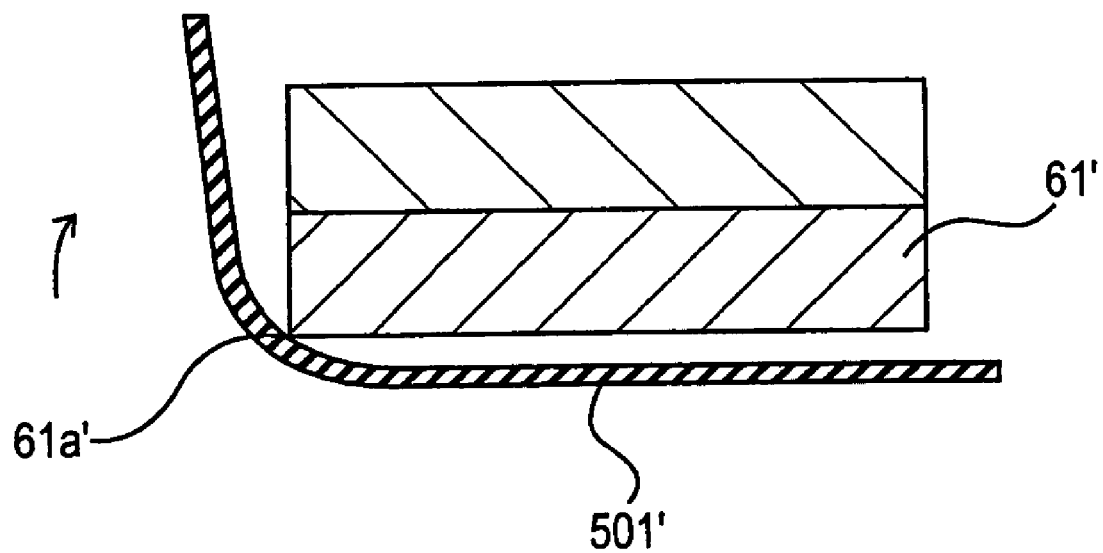
FIG. 11B is a partially enlarged cross-sectional view showing an electro-optical device according to an embodiment of the present invention.

In a comparative example shown in FIG. 11B, an outer edge of a wall portion 61' has an angular ridge portion 61a'. In this case, if a FPC 501' is bent in an arrow direction, there is a possibility that wiring lines provided on a surface of the FPC 501, can be damaged due to contacting with the ridge portion 61a' of the wall portion 61' made of metal. Further, if the FPC 501' is bent along the ridge portion 61a', there is a possibility that the FPC 501' itself may be broken because stress is concentrated on a contacting portion of the FPC 501'.

Furthermore, in the present embodiment, a surface of a portion of the FPC 501, which can come into contact with the wall portion 61, is locally provided with a protective film 502, as shown in FIG. 11A. The protective film 502 can be formed on a surface of the FPC 501 using an insulation film by means of a printing method or the like or can be adhered on the surface of the FPC 501 using an insulation resin film. For this reason, damage to the FPC 501 itself and the wiring lines formed the surface of the FPC 501 can more surely be prevented.

Operation of Liquid Crystal Light Valve

Figure 12:
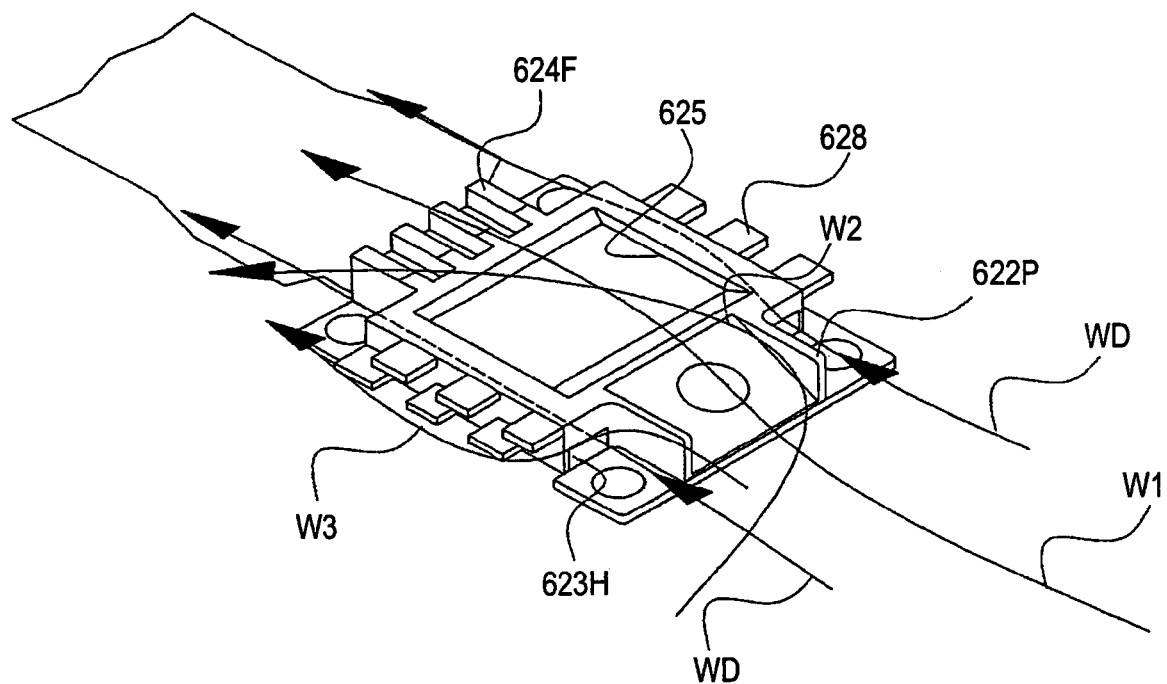
FIG. 12 is a perspective view illustrating an electro-optical device according to an embodiment of the invention, which is an explanatory view of a typical wind flow in a corresponding electro-optical device.
Figure 13:
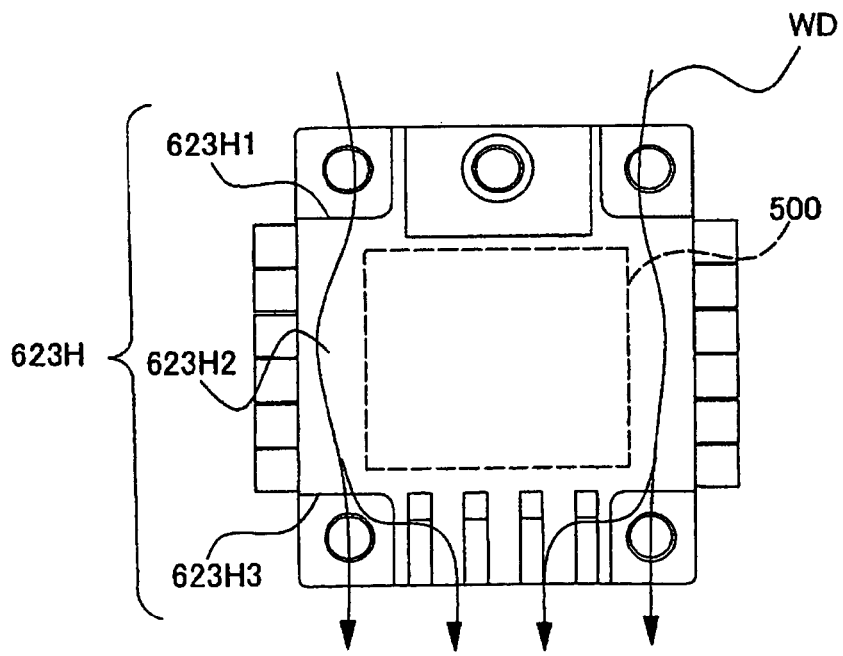
FIG. 13 is a plan view of an electro-optical device according to an embodiment of the present invention, which is an explanatory view of cooling air that flows through a cooling air conductive portion.

Next, the operation of the above-mentioned liquid crystal light valve will be described with reference to FIGS. 12 and 13. FIG. 12 shows a typical method of flowing the wind for the liquid crystal light valve according to the present embodiment. FIG. 13 shows cooling air that circulates through the cooling air conductive portion 623H.

In the liquid crystal light valve according to the present embodiment, the mounting case 601 has the above-mentioned structure. In the liquid crystal projector 1100 as shown in FIG. 1, the wind sent from the sirocco fan 1300 flows as indicated by the arrows in FIGS. 12 and 13 in the mounting case 601 and the cover portion 620. Further, in order to realize the flow of the cooling air, it is necessary to dispose the liquid crystal light valves 100R, 100G and 100B such that the supply openings 100RW, 100GW and 100BW of FIG. 1 are disposed opposite to the cooling air introducing portion 622 constituting the cover 620.

The flow of the wind, such as the cooling airs W1, W2 and W3 shown in FIG. 12, is realized on the surface of the mounting case 601. For this reason, the liquid crystal panel 500 can be effectively cooled down. It can be possible by that the cooling air flows toward the cover body portion 623 after having flown above the tapered portion 622T (see a reference numeral W1), or most of the cooling air can be guided above the tapered portion 622T and to the cover body portion 623 (see a reference numeral W2) even though the cooling air flows in any direction by disposing the cooling air guiding plate 622P in the cooling air introducing portion 622. The cooling airs W1 and W2 removes heat of the liquid crystal panel 500 from an exposed surface of the window 625. In other words, the liquid crystal light valve of the present embodiment can effectively send cooling air to the cover body portion 623, and can directly remove heat generated in the liquid crystal panel 500.

Furthermore, the wind that reaches the outside (that is, a side not opposite to the tapered portion 622T) of the cooling air guiding plate 622P of the cooling air introducing portion 622 (see a reference numeral W3) or the wind that reaches the surface or the vicinity of the liquid crystal panel 500 and then flows to the side of the cover body portion 623 reaches the side pin portions 628, or the cooling airs W1 and W2 reaches the rear pin portions 624F. Thus, the cover portion 620 can be effectively cooled down. If the cover portion 620 is effectively cooled down, heat that is transmitted from the liquid crystal panel 500 to the plate portion 610 and the cover portion 620 can be very effectively discharged to the outside of the mounting case 601. Here, since the protruding direction of the rear pin portions 624F is almost the same as those of the cooling airs W1 and W2, it contributes to formation of the flow of the wind. Moreover, in the present embodiment, the wall portion 61 that is provided under the rear pin portions 624F and defines the cooling air outlet 623H3 extends as much as the rear pin portions 624F are mounted, which contributes to an increase in the surface area of the mounting case 601 and an increase in cooling efficiency of the liquid crystal panel 500.

Further, in this case, the cooling air conductive portion 623H is formed in the cover body portion 623, so that the cooling air passes through the cover portion 620 (see a reference numeral WD in the drawing). In other words, the cooling air WD that is flown toward the cooling air introducing portion 622 enters from the cooling air inlet 623H1 into the cover body portion 623, exits through the passage 623H2, and flows from the cooling air outlet 623H3 to the outside of the cover body portion 623. At this time, a portion of one surface constituting the passage 623H2 includes both sides of the liquid crystal panel 500 (see FIG. 6), as described above. Thus, the cooling air WD directly cools down the liquid crystal panel 500. Furthermore, the other portion of the surface constituting the passage 623H2 includes a portion of an inner surface of the plate portion 610 or the cover portion 620. Accordingly, the cooling air WD also cools down the plate portion 610 and the cover portion 620.

In this case, the cooling air conductive portion 623H has the cooling air inlet 623H1 and the cooling air outlet 623H3 at both sides of the cover body portion 623H, which are opposite to each other. The cooling air that has cooled the liquid crystal panel 500 or the cover portion 620 and the plate portion 610 rapidly flows outside the mounting case 601 from the cooling air outlet 623H3, and fresh cooling air is always fed from the cooling air inlet 623H1. In other words, cooling air can frequently circulate.

In addition, in the present embodiment, the wall portion 61 that defines the opening of the cooling air outlet 623H3 has a cross-sectional shape in which it widens from the inside to the outside of the mounting case 601. Ventilation can be smoothly performed by means of the cooling air conductive portion 623. Accordingly, cooling efficiency of the liquid crystal panel 500 can be further improved.

As described above, in the present embodiment, the wall portion 61 in the mounting case 601 has the cut portion 61a at its outer edge. It is thus possible to prevent damage to the FPC 501 that comes into contact with the liquid crystal panel 500. It is also possible to prevent deterioration of the manufacturing quality of the liquid crystal light valve 100 in the liquid crystal projector 1100.

Furthermore, by means of the shape of the wall portion 61, ventilation is relatively smoothly performed by the cooling air conductive portion 623. The liquid crystal panel 500 can be efficiently cooled down. Therefore, degradation of the liquid crystal layer 50 in the liquid crystal panel 500 or generation of hot spots can be prevented in advance. It is therefore possible to prevent the display quality in the liquid crystal light valve 100 and the liquid crystal projector 1100 from lowering.

Modification Related to Wall Portion Defining Cooling Air Outlet 623H3

In the above-described embodiment, it has been described that the wall portion 61 has the cut portion 61a at its outer edge. However, the wall portion according to the invention can have a cross-sectional shape in which it widens from the inside to the outside of the mounting case in the cross section (for example, the cross section of FIGS. 10 and 11A) that crosses the surface of the flexible wiring board along a direction from the inside to the outside of the mounting case such that damage to the flexible wiring board can be prevented or reduced. The wall portion can be modified in various ways.

Figure 14:
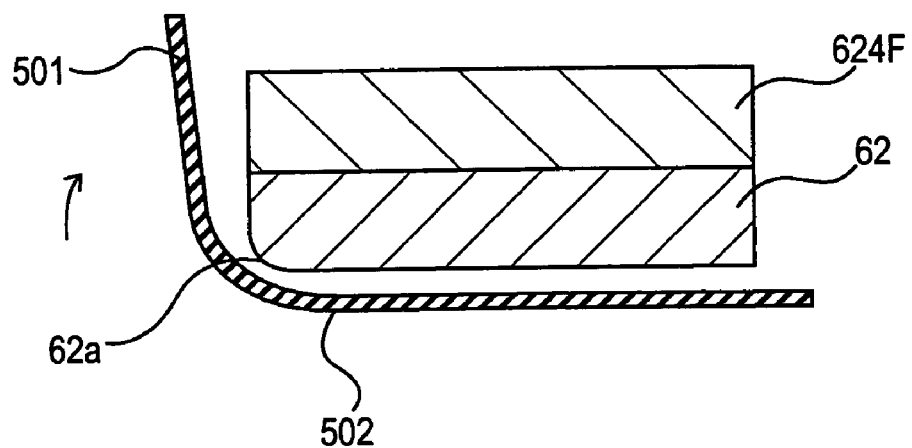
FIG. 14 is a cross-sectional view showing a modification example of the wall portion of the electro-optical device according to an embodiment of the present invention.

For example, in a modification of FIG. 14, the outer edge 62a of the wall portion 62 is rounded. In this case, the FPC 501 does not have an angular portion at the outer edge 62a even when it comes into contact with the outer edge 62a. Thus, the FPC 501 rarely damages the outer edge 62a.

Figure 15:
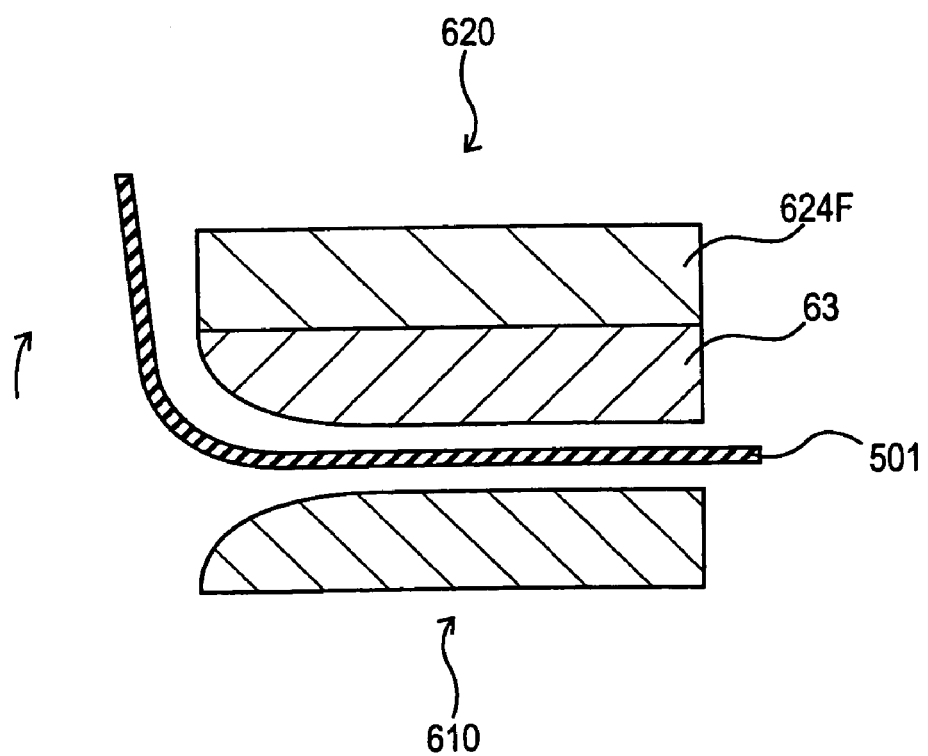
FIG. 15 is a cross-sectional view showing a modification example of the wall portion of the electro-optical device according to an embodiment of the present invention.

A modification of FIG. 15 shows a case where the outer edge 62a of the wall portion 62 is more rounded. In other words, the wall portion 63 and the wall portion 64 are a portion of the cover portion 620 and the plate portion 610, respectively. The opening of the cooling air outlet 623H3, which is defined by the wall portions 63 and 64, gradually widens in a relatively wide area from the inside to the outside of the mounting case. For this reason, the damage to the FPC 501 can be prevented and ventilation can be more smoothly performed by means of the cooling air conductive portion 623. Furthermore, the wall portion according to the invention can have a characteristic cross-sectional shape on one side of the FPC 501, that is, a side where the FPC 501 is bent, as in the above-mentioned embodiment, but can have a characteristic cross-sectional shape at both sides of the FPC 501, as in the modifications.

It is to be understood that the invention is not limited to the above-mentioned embodiments, but various changes and modifications can be made without departing from the scope and spirit of the invention readable from the appended claims and the specification. A mounting case for an electro-optical device, an electro-optical device and an electronic apparatus are also included in the technical scope of the invention. Furthermore, in the above-described embodiments, the liquid crystal light valve having the liquid crystal panel has been described as an example. However, the electro-optical device according to the invention can include various display devices such as an electroluminescent device, an electrophoresis device, a display device employing an electron emission element (field emission display and surface-conduction electron-emitter display) and the like as the electro-optical panel, in addition to the liquid crystal panel. Furthermore, the electronic apparatus having the electro-optical device according to the invention can be a projector of a reflection type as well as a projection type. The invention can also be applied to various electronic apparatuses such as television receivers, cellular phones, electronic notes, word processors, view-finder-type or monitor-direct-view-type video tape recorders, workstations, videophones, POS terminals, and touch panels.

What is claimed is:

1. A mounting case for an electro-optical device that accommodates an electro-optical panel used in the electro-optical device in which display images are displayed based on electrical signals transmitted to and from outside of the mounting case through the mounting case, the mounting case for the electro-optical device comprising:
 a body portion that is constructed to accommodate the electro-optical panel in a state in which one end of a flexible wiring board for transmitting the electrical signals is connected to a periphery of the electro-optical panel and which has a wall portion defining an opening through which the other end of the flexible wiring board leads from the inside to the outside of the mounting case,
 wherein the wall portion has a cross-sectional shape that monotonically narrows from an inside to an outside of the mounting case in a cross section crossing a surface of the flexible wiring board in a direction from an inside toward an outside of the mounting case.

2. The mounting case for an electro-optical device according to claim 1,
 wherein the wall portion is chamfered at an outer edge of the opening.

3. The mounting case for an electro-optical device according to claim 1,
 wherein the wall portion is rounded at an outer edge of the opening.

4. The mounting case for an electro-optical device according to claim 1,
 wherein the body portion includes a mounted member on which the electro-optical panel is mounted, and a cover member that covers an upper side of the mounted member, and
 the wall portion is constructed as a portion through which the mounted member and the cover member are opposite to each other with a predetermined gap interposed therebetween.

5. The mounting case for an electro-optical device according to claim 1,
 wherein a protective film is locally formed at a portion of the flexible wiring board that can come into contact with the wall portion.

6. The mounting case for an electro-optical device according to claim 1,
 wherein the wall portion extends from the inside to the outside of the mounting case at a predetermined region of a periphery of the body portion in plan view.

7. The mounting case for an electro-optical device according to claim 6,
 wherein radiation pins are provided on an external surface of the body portion in a predetermined region.

8. The mounting case for an electro-optical device according to claim 7,
 wherein the radiation pins extend in a direction where the flexible wiring board extends.

9. An electro-optical device comprising:
 the mounting case for an electro-optical device according to claim 1;
 the electro-optical panel accommodated in the body portion; and
 the flexible wiring board having one end connected to the periphery of the electro-optical panel and the other end led to the outside through the opening.

10. An electronic apparatus comprising the electro-optical device according to claim 9.

11. A mounting case for accommodating an electro-optical panel in which display images are based on electrical signals transmitted through a flexible wiring board connected to a periphery of the electro-optical panel, the mounting case comprising:
 a body portion that is constructed to accommodate the electro-optical panel with one end of the flexible wiring board connected to the periphery of the electro-optical panel; and
 a wall portion defining an opening through which an other end of the flexible wiring board leads from an inside to an outside of the body portion, the wall portion having a cross-sectional thickness in a cross section crossing a surface of the flexible wiring board that decreases monotonically in a direction from an inside toward an outside of the mounting case.

* * * * *